(12) United States Patent
Chen et al.

(10) Patent No.: US 12,267,125 B2
(45) Date of Patent: Apr. 1, 2025

(54) NEAR-FIELD COMMUNICATION CONTROL METHOD, NEAR-FIELD COMMUNICATION CONTROL DEVICE AND DISPLAY DEVICE

(71) Applicants: Chengdu BOE Optoelectronics Technology Co., Ltd., Sichuan (CN); BOE TECHNOLOGY GROUP CO., LTD., Beijing (CN)

(72) Inventors: Qian Chen, Beijing (CN); Hongqiang Luo, Beijing (CN); Xiaofeng Luo, Beijing (CN); Yang Yang, Beijing (CN); Qiang Wang, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/024,524

(22) PCT Filed: May 31, 2022

(86) PCT No.: PCT/CN2022/096151
§ 371 (c)(1),
(2) Date: Mar. 3, 2023

(87) PCT Pub. No.: WO2023/230814
PCT Pub. Date: Dec. 7, 2023

(65) Prior Publication Data
US 2024/0283485 A1   Aug. 22, 2024

(51) Int. Cl.
*H04B 5/26* (2024.01)
*G09G 5/12* (2006.01)

(52) U.S. Cl.
CPC .............. *H04B 5/26* (2024.01); *G09G 5/12* (2013.01); *G09G 2310/08* (2013.01); *G09G 2370/16* (2013.01)

(58) Field of Classification Search
CPC .................................. H04B 5/26; G09G 5/12
See application file for complete search history.

(56) References Cited

U.S. PATENT DOCUMENTS

| 2016/0063907 A1* | 3/2016 | Lin | .............. H04B 15/00 345/204 |
| 2018/0322823 A1 | 11/2018 | Alousi et al. | |
| 2023/0206211 A1* | 6/2023 | Bianconi | ............ G06K 7/10297 705/39 |

FOREIGN PATENT DOCUMENTS

| CN | 106598334 A | 4/2017 |
| CN | 110364107 A | 10/2019 |

(Continued)

*Primary Examiner* — Nelson M Rosario
*Assistant Examiner* — Scott D Au
(74) *Attorney, Agent, or Firm* — HOUTTEMAN LAW LLC

(57) ABSTRACT

The embodiments of the present disclosure provide a near-field communication control method, device, and display device. The near-field communication control device is applied to a display device. The display device includes a display panel, a near-field communication coil and a display control circuit, wherein the display panel includes a plurality of display periods, and each display period includes a field blanking phase and an effective display phase, the near-field communication control device includes: a first receiving circuit configured to receive a synchronization signal output from the display control circuit, wherein the display panel displays an image during the effective display phase under the control of the synchronization signal; and a driving circuit configured to output a driving signal to the near-field communication coil during the field blanking phase, according to the synchronization signal.

12 Claims, 4 Drawing Sheets

(56) References Cited

FOREIGN PATENT DOCUMENTS

| | | |
|---|---|---|
| CN | 113220163 A | 8/2021 |
| WO | 2022067049 A1 | 3/2022 |

* cited by examiner

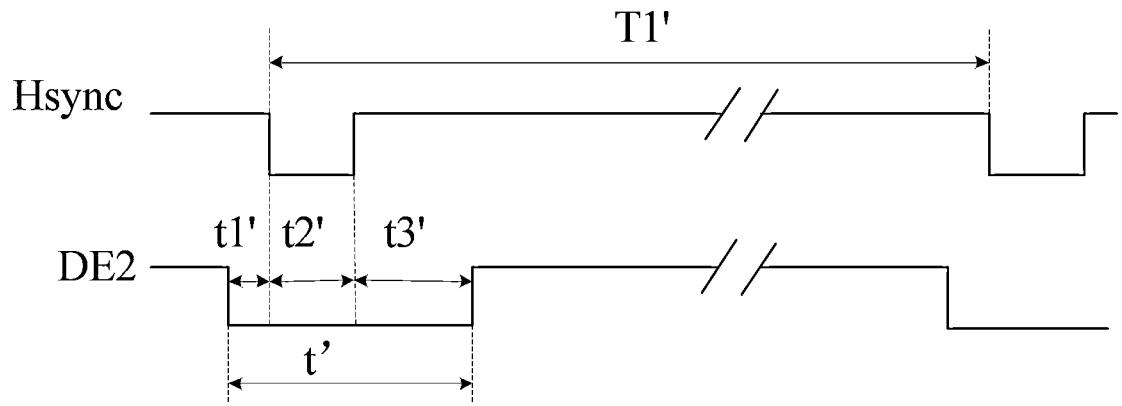
FIG.5b
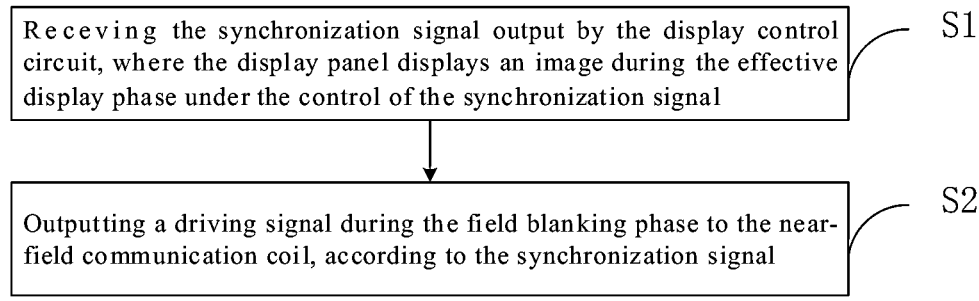
FIG.6
S21:
| Initial timing at which the driving signal starts to be output for the $i^{th}$ time is an $(i \times N)^{th}$ active edge of the field synchronization signal | — S210 |
FIG.7a

S21:

NEAR-FIELD COMMUNICATION CONTROL METHOD, NEAR-FIELD COMMUNICATION CONTROL DEVICE AND DISPLAY DEVICE

TECHNICAL FIELD

The present disclosure relates to the technical field of display, and in particular, to a near-field communication control method, a near-field communication control device and a display device.

BACKGROUND

Near-field Communication (NFC) technology is a short-range, high-frequency radio technology that enables identification and data exchange with compatible devices over a short distance. NFC can be integrated into mobile terminals, for example serving as access control keys, information verification, etc., and can also be combined with the payment function of mobile terminals, for example serving as traffic cards, credit cards, payment cards, etc.

SUMMARY

The embodiments of the present disclosure provide a near-field communication control device, method and a display device.

As a first aspect, an embodiment of the present disclosure provides a near-field communication control device for a display device, the display device including a display panel, a near-field communication coil and a display control circuit. The display panel includes a plurality of display periods, and each of the plurality of display periods includes a field blanking phase and an effective display phase. The near-field communication control device includes a first receiving circuit configured to receive a synchronization signal output from the display control circuit, wherein the display panel displays an image during the effective display phase under the control of the synchronization signal; and a driving circuit configured to output a driving signal to the near-field communication coil during the field blanking phase, according to the synchronization signal.

In some embodiments, the driving circuit includes a processing sub-circuit configured to determine start timings, at each of which the driving signal starts to be output, according to a pre-acquired correspondence between the synchronous signal and the field blanking phase, wherein each of the start timings is in the field blanking phase; and an output sub-circuit configured to output the driving signal for a preset time period starting from the start timing, the preset time period being less than a preset duration of a back porch period of the field blanking phase.

In some embodiments, the synchronization signal includes a field synchronization signal, and the start timing at which the driving signal starts to be output for the $i^{th}$ time is a timing of an $(i \times N)^{th}$ active edge of the field synchronization signal.

In some embodiments, the processing sub-circuit is configured to: determining a duration of the display period of the display panel according to the synchronous signal; determining a duration of a control period of the near-field communication control module according to the duration of the display period and a preset ratio, wherein the duration of the control period is a duration of an interval time period between the start timings of two adjacent outputs of the drive signal; determining the start timing at which the driving signal starts to be output for the first time, according to the pre-acquired correspondence between the synchronous signal and the field blanking phase; and determining the start timings at each of which the driving signal starts to be output after the driving signal is output for the first time, according to the start timing at which the driving signal starts to be output for the first time and the duration of the control period.

In some embodiments, the synchronization signal includes a field synchronization signal and/or a row synchronization signal.

In some embodiments, the driving signal includes a plurality of pulses. The output sub-circuit includes a crystal oscillator configured to generate an initial clock signal; a timer; a pulse generation circuit configured to generate, according to timing of the timer and the initial clock signal, an initial driving signal for a preset time period starting from the start timing, the initial driving signal being a digital signal; and a digital-to-analog conversion circuit configured to perform digital-to-analog conversion on the initial driving signal, to generate and output the driving signal.

In some embodiments, the near-field communication control device further includes: a second receiving circuit configured to receive induction information from the near-field communication coil and perform a pre-processing on the induction information; and a transmission circuit configured to transmit the pre-processed induction information to a main control circuit, so that the main control circuit determines interaction information between an external device and the display device according to the induction information.

In some embodiments, the pre-processing includes an analog-to-digital conversion.

As a second aspect, an embodiment of the present disclosure provides a near-field communication control method for a display device, the display device including a display panel, a near-field communication coil and a display control circuit. The display panel includes a plurality of display periods, and each of the plurality of display periods includes a field blanking phase and an effective display phase. The near-field communication control method includes: receiving a synchronization signal output from the display control circuit, wherein the display panel displays an image during the effective display phase under the control of the synchronization signal; and outputting a driving signal to the near-field communication coil during the field blanking phase, according to the synchronization signal.

In some embodiments, outputting the driving signal to the near-field communication coil during the field blanking phase according to the synchronization signal includes: determining start timings, at each of which the driving signal starts to be output, according to a pre-acquired correspondence between the synchronous signal and the field blanking phase, wherein each of the start timings is in the field blanking phase; and outputting the driving signal for a preset time period starting from the start timing, the preset time period being less than a preset duration of a back porch period of the field blanking phase.

In some embodiments, the synchronization signal includes a field synchronization signal, and the start timing at which the driving signal starts to be output for the $i^{th}$ time is a timing of an $(i \times N)^{th}$ active edge of the field synchronization signal.

In some embodiments, determining start timings, at each of which the driving signal starts to be output, according to the pre-acquired correspondence between the synchronous signal and the field blanking phase, includes: determining a duration of the display period of the display panel according to the synchronous signal; determining a duration of a control period of the near-field communication control module according to the duration of the display period and a preset ratio, wherein the duration of the control period is a duration of an interval time period between the start timings of two adjacent outputs of the drive signal; determining the start timing at which the driving signal starts to be output for the first time, according to the pre-acquired correspondence between the synchronous signal and the field blanking phase; and determining the start timings, at each of which the driving signal starts to be output after the driving signal is output for the first time, according to the start timing at which the driving signal starts to be output for the first time and the duration of the control period.

In some embodiments, the synchronization signal includes a field synchronization signal and/or a row synchronization signal.

As a third aspect, an embodiment of the present disclosure provides a display device, including a display panel, a near-field communication coil and the near-field communication control device described above.

BRIEF DESCRIPTION OF DRAWINGS

The accompanying drawings, which are included to provide a further understanding of the present disclosure and are incorporated in and constitute a part of this specification, illustrate the present disclosure together with the embodiments below, but do not constitute a limitation of the present disclosure. In the drawings:

FIG. 5b is a timing diagram of a row synchronization signal and an enable signal according to an embodiment of the present disclosure.

FIG. 6 is a schematic flowchart of a near-field communication control method according to an embodiment of the present disclosure.

FIG. 7a is a schematic flowchart of step S21 according to an embodiment of the present disclosure.

BRIEF DESCRIPTION OF DRAWINGS

Specific embodiments of the present disclosure will be described in detail below in conjunction with the accompanying drawings. It should be understood that the specific embodiments described herein are only used to illustrate and explain the present disclosure and are not intended to limit the present disclosure.

In order to make the purpose, technical solutions and advantages of the embodiments of the present disclosure clearer, the technical solutions of the embodiments of the present disclosure will be described clearly and completely in combination with the drawings of the embodiments of the present disclosure. Obviously, the described embodiments are a part of the embodiments of the present disclosure, not all of them. Based on the described embodiments of the present disclosure, all other embodiments obtained by those skilled in the art without creative work fall within the protection scope of the present disclosure.

Unless otherwise defined, technical or scientific terms in the embodiments of the present disclosure should have the ordinary meaning as understood by one of ordinary skill in the art to which the present disclosure belongs. The use of "first," "second," and the like in the present disclosure is not intended to indicate any order, quantity, or importance, but rather to distinguish one element from another. Similarly, the word "include" or "comprise", and the like, means that the element or item preceding the word comprises the element or item listed after the word and its equivalent, but does not exclude other elements or items. The terms "connect" or "couple" and the like are not restricted to physical or mechanical connections, but may include electrical connections, whether direct or indirect. "Upper", "lower", "left", "right", and the like are used only to indicate relative positional relationships, and when the absolute position of the object described changes, the relative positional relationships may also change accordingly.

Near-field Communication (NFC) technology is a short-range, high-frequency radio technology that enables identification and data exchange with compatible devices over a short distance. NFC may realize mutual communication between any two wireless devices, such as information exchange, content access and service exchange, etc. NFC may be integrated into mobile terminals, for example serving as access key, information verification, etc, or may be combined with the payment function of mobile terminals, for example serving as traffic cards, credit cards, payment cards, etc.

Figure 1:
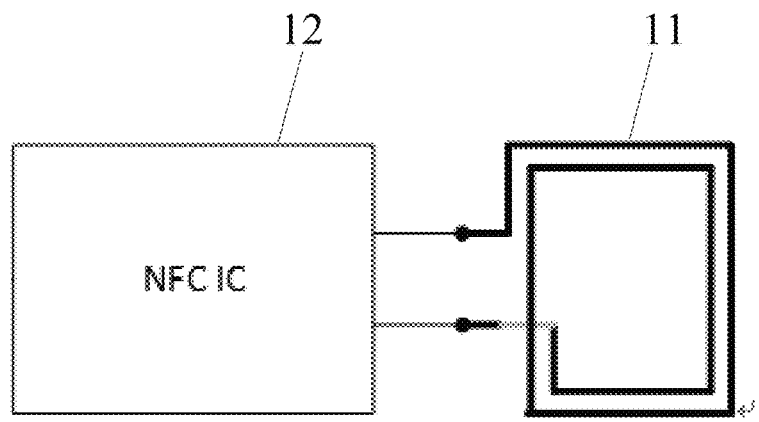
FIG. 1 is a schematic diagram showing a structure of an NFC device.

FIG. 1 is a schematic diagram showing a structure of an NFC device. As shown in FIG. 1, the NFC device includes an NFC coil 11 and an NFC controller 12 (e.g., an NFC IC). An operation phase of the NFC controller 12 includes a polling phase and a monitoring phase. During the polling phase, the NFC controller 12 outputs a driving signal (e.g., the driving signal includes a plurality of pulses) to the NFC coil 11 to drive the NFC coil 11 to receive and transmit a radio-frequency signal. During the monitoring phase, the NFC controller 12 reads an induction signal on the NFC coil 11, processes the induction signal, and sends the processed induction signal to a main control circuit at the front end, so that the main control circuit determines whether an external device is close to the NFC coil and determines an interaction signal between the external device and the device with the NFC controller. In an example, the duration of the monitoring phase is about 1.5 s.

With the development of radio technology, NFC devices are increasingly applied to display devices to realize communication between the display devices and other wireless devices.

Figure 2:
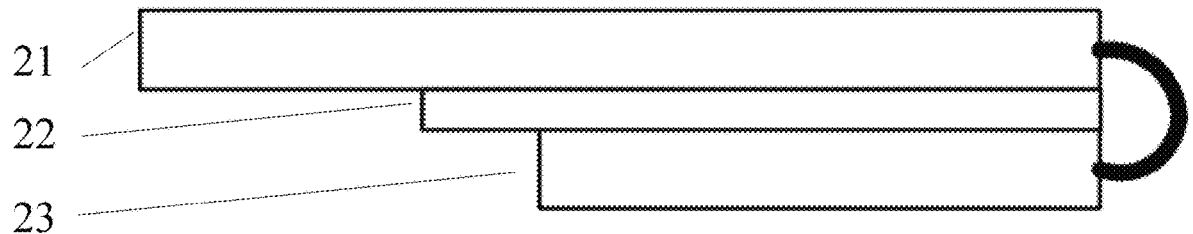
FIG. 2 is a schematic diagram showing an arrangement of an NFC device in a display device according to an embodiment of the present disclosure.

FIG. 2 is a schematic diagram showing an arrangement of an NFC device in a display device. As shown in FIG. 2, the display device includes a display panel 21, an NFC device 22, and a driving circuit board 23. The NFC device 22 includes an NFC coil and an NFC controller. The driving circuit board 23 is located on a non-display side of the display panel 21, and the driving circuit board 23 is connected to the display panel 21 through a flexible circuit board. The NFC controller 22 and a display control circuit are disposed on the driving circuit board 23. A ferrite is further provided on the driving circuit board, the added thread on the surface of the ferrite can concentrate the magnetic flux, thereby improving the intensity and the stability of the radio-frequency signal received or sent by the NFC device.

Figure 3:
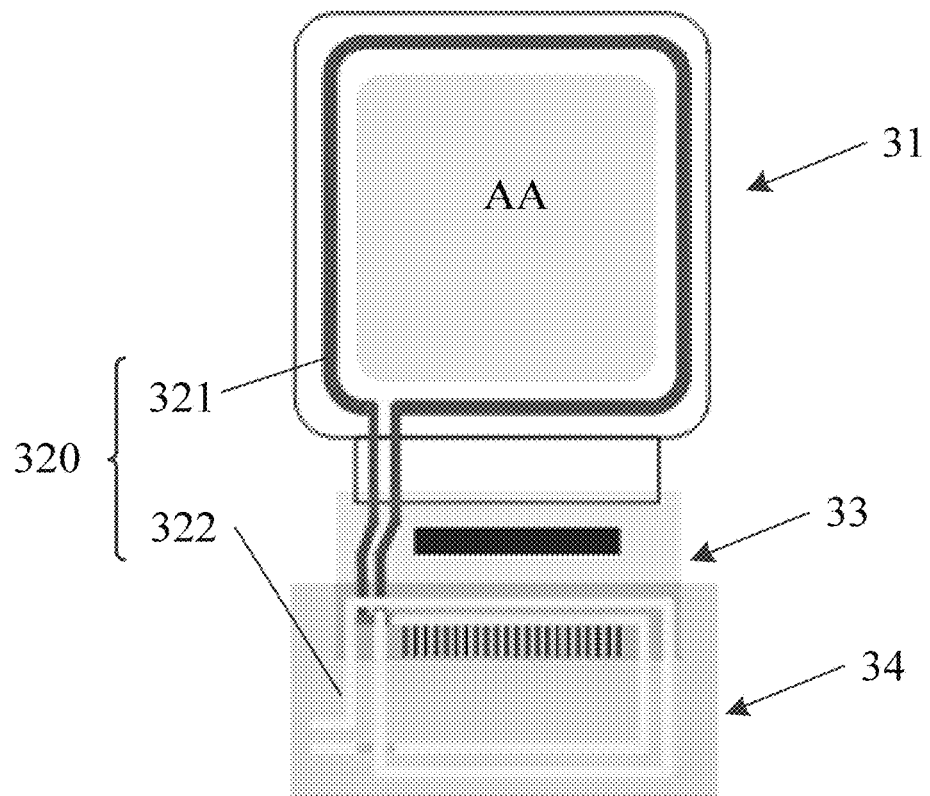
FIG. 3 is a schematic diagram showing an arrangement of an NFC device in a display device according to another embodiment of the present disclosure.

FIG. 3 is a schematic diagram of an arrangement of an NFC device in a display device according to another embodiment of the present disclosure. In order to further improve the integration of the NFC device in the display device, two NFC coils are provided in the display device. As shown in FIG. 3, the display device includes a display panel 31, an NFC device, a flexible circuit board 33, and a driving circuit board 34. The driving circuit board 34 is electrically connected to the display panel 31 through the flexible circuit board 33. The NFC device includes an NFC coil 320 and an NFC controller (not shown). The driving circuit board 34 is provided thereon with a display control chip for controlling the display panel to display images. The display panel has a display region AA and a peripheral region. The NFC coil 320 includes a first coil 321 and a second coil 322. The first coil 321 is located in the peripheral region of the display panel, the second coil 322 and the NFC controller are integrated on the driving circuit board, and the first coil 321 is connected to the second coil 322 in parallel.

However, no matter which structure the NFC device has, during the operation process of the NFC device, since the NFC controller sends a driving signal to the NFC coil during the polling phase, when a display frequency of the display panel is high, the polling phase is prone to overlap the display phase of the images, thereby resulting in that the driving signal interferes with the display signal (e.g., a data signal), and thus a phenomenon of a flashing of the display panel occurs.

Figure 4A:
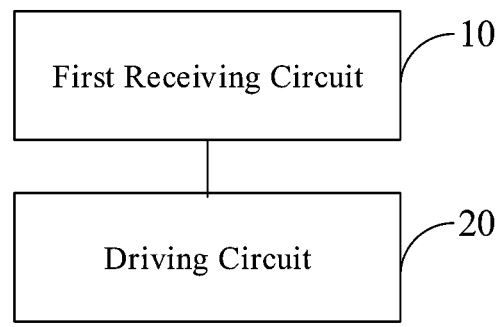
FIG. 4a is a schematic diagram showing a structure of a near-field communication control device according to an embodiment of the present disclosure.

In order to solve at least one of the above technical problems, an embodiment of the present disclosure provides a near-field communication control device. FIG. 4a is a schematic diagram showing a structure of the near-field communication control device according to an embodiment of the present disclosure.

As shown in FIG. 4a, the near-field communication control device according to an embodiment of the present disclosure is applied to a display device. The display device includes a display panel, a near-field communication coil, and a display control circuit. The display panel includes a plurality of display periods, and each of the display periods includes a field blanking phase and an effective display phase. The near-field communication control device includes a first receiving circuit 10 and a driving circuit 20.

The first receiving circuit 10 is configured to receive a synchronization signal output by the display control circuit. The display panel displays images under the control of the synchronization signal during the effective display phase. The driving circuit 20 is configured to output a driving signal to the near-field communication coil according to the synchronization signal during the field blanking phase.

In some embodiments, the synchronization signal includes a frame synchronization signal and/or a row synchronization signal.

It should be noted that when the display panel plays a video, the video is divided into multiple frames of image for displaying. A refresh frequency of the display panel is the number of frames of image displayed by the display panel per second, and the refresh frequency is generally expressed in hertz (Hz). For example, the refresh frequency of the display panel is 60 Hz, which means that the display panel displays 60 frames of image per second. The display duration of each of frames of image represents one display period. The display period is 1/60 s when the refresh frequency of the display panel is 60 Hz.

The display panel includes a plurality of rows of pixels, a gate driving circuit for supplying scan signals to the plurality of rows of pixels, and a data driving circuit for supplying data signals to the plurality of rows of pixels respectively. When displaying one frame of image, the gate driving circuit provides the scan signal to the plurality of rows of pixels row by row. The scan signal is provided to each row of pixels, the data driving circuit provides the data signals to the row of pixels for displaying. After the scan signal is provided to the last row of pixels in the immediately previous frame of displayed image, the scan signal is not immediately provided to the first row of pixels in the current frame of displayed image. That is, a certain interval exists between the effective display phases of two adjacent display periods, and the certain interval is a field blanking period.

Figure 5A:
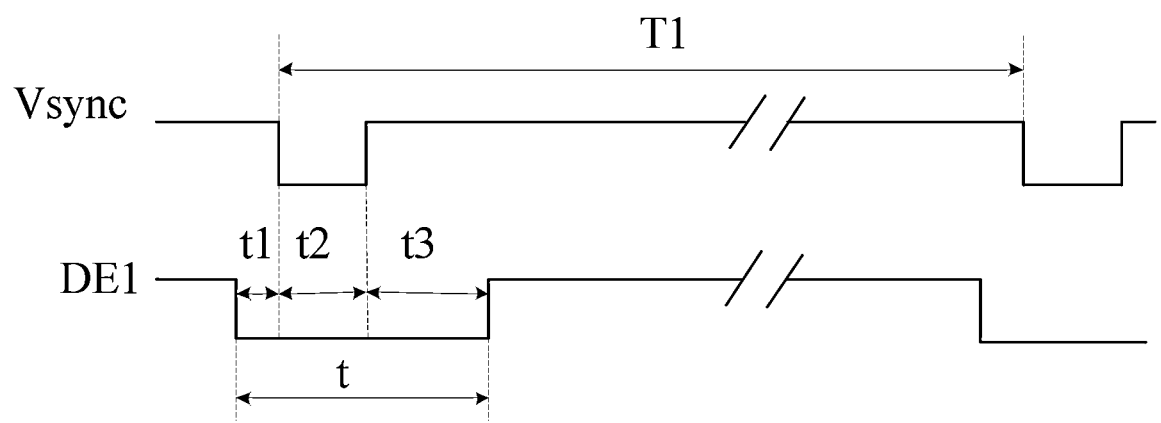
FIG. 5a is a timing diagram of a field synchronization signal and an enable signal according to an embodiment of the present disclosure.

FIG. 5a is a timing diagram of a field synchronization signal and an enable signal according to an embodiment of the present disclosure, and FIG. 5b is a timing diagram of a row synchronization signal and an enable signal according to an embodiment of the present disclosure. The field synchronization signal indicates that a display panel will start displaying an image, and the row synchronization signal indicates that a next row of pixels will be scanned when the row synchronization signal has an active level (e.g., a low level). Each period of the enable signal corresponds to a corresponding row period. When the enable signal has an active level (e.g., a high level), the data driving circuit outputs an active data signal to a corresponding row of pixels for displaying.

Taking the display panel having a resolution of 1024×768 bpi as an example, as shown in FIG. 5a, an active level of the field synchronization signal Vsync is a low level, and an active level of the first enable signal DE1 is a high level. When the first enable signal DE1 has an active level, the data signal is output through the data line, that is, the effective display phase of the image is a phase during which the first enable signal DE1 has an active level. After the field synchronization signal Vsync reaches the active level, the first enable signal DE1 cannot be immediately enabled. A period from the timing when the active level of the field synchronization signal Vsync ends to a timing when the first enable signal DE1 reaches the active level is a back porch period t3 of the field blanking phase. A period from a timing when the active level of the enable signal for immediately previous frame of image ends to a timing when the active level of the field synchronization signal Vsync starts is a front porch period t1 of the field synchronization signal. The front porch period t1, the duration t2 of the active level of the field synchronization signal Vsync, and the back porch period t3 jointly constitute the field blanking period t. An interval time period T1 between two adjacent field synchronization signals is a duration of the display period.

Similarly, as shown in FIG. 5b, the active level of the row synchronization signal Hsync is a low level. The front porch period t1' of the row synchronization signal, the duration t2' of the low level of the row synchronization signal, and the back porch period t3' jointly constitute a row blanking period t'. The active level of the second enable signal DE2 is a high level. when the second enable signal DE2 has an active level, one row of pixels for the display image are refreshed through the data lines, that is, 1024 pixels.

The field blanking period t is actually an interval time period between adjacent frames of image displayed on the display panel. During the field blanking period t, no display signal is supplied to the pixels of the display panel. Therefore, in the embodiment of the present disclosure, the NFC control device outputs the driving signal to the NFC coil according to the field synchronization signal and/or the row synchronization signal during the field blanking phase, so as to avoid a poor display defect of the display panel due to interference between the driving signal and the display signal of the display panel.

Figure 4B:
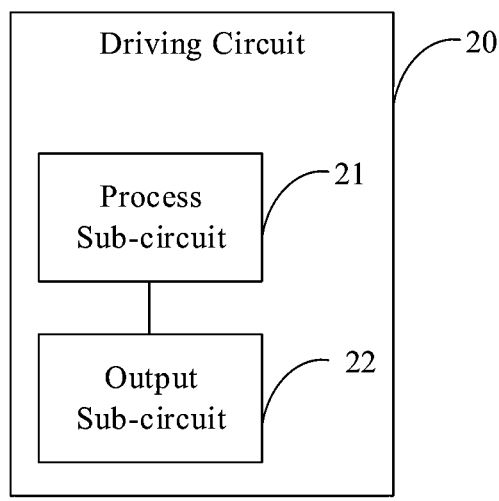
FIG. 4b is a schematic diagram showing a structure of a driving circuit according to an embodiment of the present disclosure.

FIG. 4b is a schematic diagram showing a structure of a driving circuit according to an embodiment of the present disclosure. In some embodiments, the driving circuit 20 includes: a processing sub-circuit 21 and an output sub-circuit 22.

The processing sub-circuit 21 is configured to determine, according to a pre-acquired correspondence between the synchronization signal and the field blanking phase, start timings at each of which the driving signal starts to be output, where the start timing is within the field blanking phase. The output sub-circuit 22 is configured to output the driving signal for a preset time period starting from the start timing, the preset time period being less than the preset duration of the back porch period of the field blanking phase.

As shown in FIG. 5a, since there is the correspondence between the synchronization signal and the field blanking phase, the start timing in the field blanking phase may be determined according to the correspondence. Since the time period during which the driving signal is output is short, if the driving signal starts to be output at the start timing within the field blanking phase, the overlapping of the driving signal and the display signal in time can be reduced or prevented.

In some embodiments, the synchronization signal includes the field synchronizing signal. The start timing at which driving signal starts to be output for the $i^{th}$ time is an $(i \times N)^{th}$ active edge of the field synchronization signal.

Generally, the interval time period between the driving signals is greater than the display period, therefore one driving signal may be output every N display periods, and the start timing at which the driving signal starts to be output is the timing of the active edge of the field synchronization signal, where N is an integer greater than 1 and N may be set as actual needed. For example, N may be determined according to the duration of the display period and the duration of the actually required control period of the near-field communication control module. For example, if the actually required control period is t0 and the duration of the display period is t, N is set to an integer close to or equal to t0/t.

The control period of the near-field communication control module includes the polling phase and the monitoring phase described above.

It should be noted that the active level of the field synchronization signal may be a high level or a low level. When the active level of the field synchronization signal is a high level, the active edge is a rising edge; and when the active level of the field synchronization signal is a low level, the active edge is a falling edge. Alternatively, when the active level of the field synchronization signal is a high level, the active edge may alternatively be a falling edge; and when the active level of the field synchronization signal is a low level, the active edge may alternatively be a rising edge, which is not limited by the embodiments of the present disclosure thereto.

In some embodiments, specifically the processing sub-circuit is configured to: determining a duration of the display period of the display panel according to the synchronous signal; determining a duration of the control period of the near-field communication control module according to the duration of the display period and a preset ratio; determining an start timing at which the driving signal starts to be output for the first time according to the correspondence between the synchronous signal and the field blanking phase acquired in advance; and determining the start timings at each of which the driving signal starts to be output after the first time according to the start timing at which the driving signal starts to be output for the first time and the duration of the control period.

The preset ratio is a ratio of the duration of the control period to the duration of the display period, and the preset ratio is an integer greater than 1. Provided that the duration of the display period is t and the preset ratio is x, the duration of the control period of the near-field communication control module is t×x. The preset ratio x may be set as needed. For example, the setting criteria of the preset ratio x is that t×x ranges from 1 s to 2 s. For example, the display period is 1/60 s, the preset ratio x can be set in a range from 60 to 120.

That is to say, the processing sub-circuit may output the driving signal according to the duration of the control period after the start timing at which the driving signal starts to be output for the first time is determined. For example, in a case where the duration of the control period is to, the driving signal may be output once every time to after the driving signal starts to be output for the first time. Since the duration of the control period is an integral multiple of the duration of the display period, the driving signal is output during the field blanking phase every time after the driving signal is output during the field blanking phase for the first time, so as to avoid a poor display defect of the display panel due to interference between the driving signal and the display signal of the display panel.

In some embodiments, the near-field communication control device may be integrated in a chip. The first receiving circuit 10 includes a plurality of interfaces, for example, a first interface, a second interface, a clock signal interface, an initialization signal interface, an I2C port, an SPI port, a reset signal interface, etc. Each of the first interface and the second interface is connected to the display driving circuit. For example, the first interface may receive the field synchronization signal, and the second interface may receive the row synchronization signal.

The first receiving circuit 10 is connected to the driving circuit 20 through a sending circuit. The driving circuit 20 includes the processing sub-circuit 21 and the output sub-circuit 22. The output sub-circuit 22 is configured to output a driving signal including a plurality of pulses. The output sub-circuit 22 includes a crystal oscillator (OSC), a timer, a pulse generation circuit, and a conversion circuit. The crystal oscillator is configured to generate an initial clock signal. The pulse generation circuit is configured to generate, starting from the start timing, an initial driving signal for a preset time period according to the timing of the timer and the initial clock signal, wherein the initial driving signal is a digital signal. The conversion circuit includes a digital-to-analog conversion circuit and an analog-to-digital conversion circuit. The digital-to-analog conversion circuit is configured to perform digital-to-analog conversion on the initial driving signal to generate and output the driving signal. The processing sub-circuit 21 and the pulse generation circuit may be integrated in a microprocessor (i.e., MCU).

In addition, the initial driving signal generated by the pulse generation circuit may be stored in a Random Access Memory (RAM), and the digital-to-analog conversion circuit reads the initial driving signal stored in the RAM.

In addition, the near-field communication control device may further include a Universal Integrated Circuit Card (i.e., UICC) configured to store information such as user information, authentication key, payment method, etc.; the near-field communication control device may further include a secure chip for services requiring a separate secure chip, such as sensitive data, encryption operation and the like, so as to realize functions such as mobile payment, key information verification and the like of an apparatus with the near-field communication control device. The near-field communication control device may further include a power supply module for supplying power.

In some embodiments, the near-field communication control device further includes a second receiving circuit and a transmission circuit. The second receiving circuit is configured to receive induction information of the near-field communication coil and pre-process the induction information. The conversion circuit further includes an analog-to-digital conversion circuit, and the pre-processing may include an analog-to-digital conversion performed by the analog-to-digital conversion circuit. The transmission circuit is configured to transmit the pre-processed induction information to the main control circuit, so that the main control circuit determines interaction information between the external device and the display device according to the induction information.

On one hand, the main control circuit may perform information interaction with the near-field communication control device, and on the other hand the main control circuit may perform information interaction with the display control circuit, so that the main control circuit may send a control signal to the display control circuit according to the interaction information between the external device and the display device, so that the display control circuit controls the display panel to display an image corresponding to the interaction information according to the control signal.

The functions of the second receiving circuit and the transmission circuit may be realized through an I2C bus and an SPI serial bus. The signal from the near-field communication control device is transmitted to other network access point or control port through I2C or SPI, so as to realize data interaction with other communication devices.

FIG. 6 is a schematic flowchart of a near-field communication control method according to an embodiment of the present disclosure. When the near-field communication control method is applied to a display device, the display device includes a display panel, a near-field communication coil, and a display control circuit. The display process of the display panel includes a plurality of display periods, and each of the plurality of display periods includes a field blanking phase and an effective display phase. As shown in FIG. 6, the method includes steps S1 and S2.

At step S1, the synchronization signal output by the display control circuit is received, and the display panel displays an image during the effective display phase under the control of the synchronization signal.

At step S2, a driving signal is input to the near-field communication coil based on the synchronization signal during the field blanking phase.

Since the field blanking period is actually an interval time period between adjacent frames of image displayed by the display panel, the display panel does not output a refresh signal during the field blanking period. Therefore, in the embodiment of the present disclosure, the near-field communication control device outputs the driving signal to the near-field communication coil during the field blanking period, so as to avoid a poor display defect of the display panel due to interference between the driving signal and the display signal of the display panel.

In some embodiments, step S2 includes steps S21 and S22.

At step S21, the start timings at each of which the driving signal starts to be output are determined according to the pre-acquired correspondence between the synchronization signal and the field blanking phase, where each of the start timings is within the field blanking phase.

At step S22, the driving signal is output for a preset time period starting from the start timing, wherein the preset time period is less than a preset duration of the back porch period of the field blanking phase.

Since the field blanking phase is determined according to the correspondence between the synchronization signal and the field blanking phase, the field blanking phase includes an active level period of the field synchronization signal and the back porch period. The field blanking phase is determined according to the active level of the synchronous signal, and the start timing at which the driving signal starts to be output may be any timing during a period in which the synchronization signal has the active level. The field blanking phase further includes a back porch period after the period of the active level, since the driving signal is output for a preset time period which is less than the duration of the back porch period of the field blanking phase, the preset time period cannot go beyond the field blanking phase, so as to avoid a poor display defect of the display panel due to interference between the driving signal and the display signal of the display panel.

FIG. 7a is a schematic flowchart of step S21 according to an embodiment of the present disclosure. In some embodiments, as shown in FIG. 7a, the synchronization signal includes a field synchronization signal. Specifically, the step S21 may include step S210. At step S210, the start timing at which the driving signal starts to be output for the $i^{th}$ time is an $(i \times N)^{th}$ active edge of the field synchronization signal.

In an example, the near-field communication control device outputs the driving signal every 1.5 s, the display period of the display panel is 1/60 s, and N is 90, that is, every 90 frames of image are refreshed (i.e., every 90 field synchronization signals are output), the near-field communication control device outputs the driving signal once at the timing of the rising edge of the field synchronization signal.

Figure 7B:
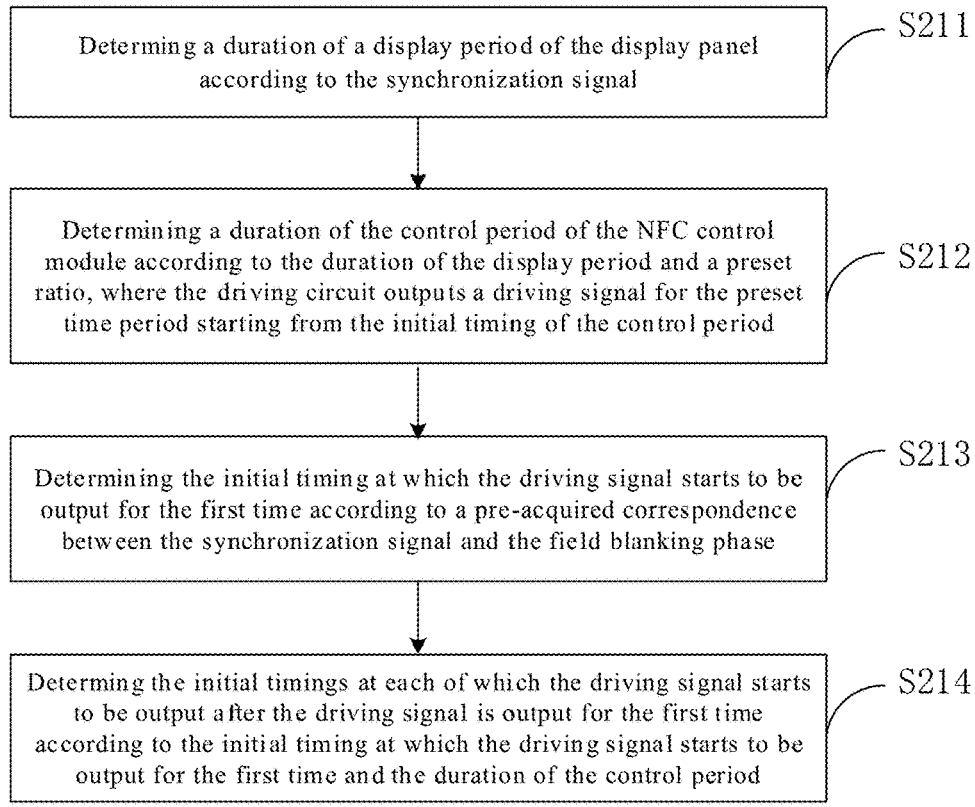
FIG. 7b is a schematic flowchart of step S21 according to another embodiment of the present disclosure.

FIG. 7b is a schematic flowchart of step S21 according to another embodiment of the present disclosure. In some embodiments, as shown in FIG. 7b, the synchronization signal may include a field synchronization signal and/or a row synchronization signal, and then the step S21 may specifically include steps S211 to S214.

At step S211, a duration of a display period of the display panel is determined according to the synchronization signal.

In the case where the synchronization signal is a field synchronization signal, an interval time period between two adjacent field synchronization signals may be determined as the duration of the display period. In the case where the synchronization signal is a row synchronization signal, the row synchronization signals may be counted to determine the number of rows of the display panel; a time period during which the entire frame is refreshed is determined according to the time period during which two adjacent rows of pixels are refreshed; and the duration of the display period may be determined in combination with the duration of the field blanking phase acquired in advance.

At step S212, a duration of the control period of the NFC control module is determined according to the duration of the display period and a preset ratio, and the driving circuit outputs a driving signal for the preset time period starting from the start timing of the control period.

In order to ensure that the driving signal is within the field blanking phase every time, it is necessary to set the duration of the control period to be an integral multiple of the duration of the display period. Among the durations of the integral multiple of the duration of the display period, the duration with the smallest difference from the duration of the reference period of the control period is determined as the duration of the control period.

In an example, the duration of the display period is 1/75 s, and the duration of the reference period of the control period is 1.5 s, 1.5/(1/75)=112.5, which is not an integer, and thus the duration of the control period is set to (1/75)×112 s or (1/75)×113 s.

At step S213, the start timing at which the driving signal starts to be output for the first time is determined according to the pre-acquired correspondence between the synchronization signal and the field blanking phase.

Since the active edge of the synchronization signal is followed by the field blanking phase, the start timing at which the driving signal starts to be output for the first time may be set to the timing of the first active edge of the field synchronization signal.

It should be noted that the field blanking phase further includes a back porch period, and therefore, the start timing at which the driving signal starts to be output for the first time may also be any timing during a period in which the field synchronization signal has the active level, which is not limited by the embodiments of the present disclosure.

At step S214, the start timings at each of which the driving signal starts to be output after the driving signal is output for the first time are determined according to the start timing at which the driving signal starts to be output for the first time and the duration of the control period.

That is, after the start timing at which the driving signal starts to be output for the first time, the driving signal starts to be output once every interval of control period.

It should be understood that the premise that each time the driving signal is within the field blanking phase is that the duration of the control period is an integral multiple of the duration of the display period, therefore the duration of the display period needs to be monitored in real time. When the change of the duration of the display period is detected according to the method in step S211, the duration of the control period needs to be determined again according to the method in S212, so as to ensure that the driving signal sent by the near-field communication control device cannot interfere with the refresh signal of the display panel.

Figure 8:
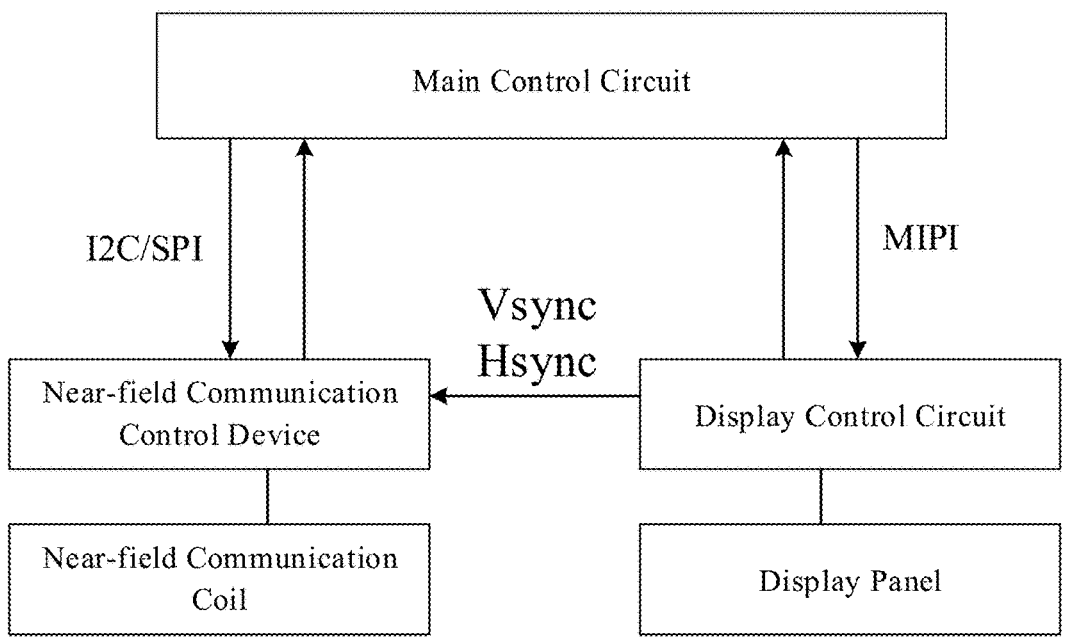
FIG. 8 is a schematic diagram showing a structure of a display device according to an embodiment of the present disclosure.

FIG. 8 is a schematic diagram showing a structure of a display device according to an embodiment of the present disclosure. As shown in FIG. 8, the display device includes a main control circuit, a display panel, a display control circuit, a near-field communication coil, and the near-field communication control device which are arranged as shown in FIG. 2 or FIG. 3.

The near-field communication control device is electrically connected to the display control circuit to receive the synchronous signal. The synchronous signal includes a field synchronous signal and/or a row synchronous signal. The near-field communication control device outputs a driving signal to the near-field communication coil during the field blanking phase according to the field synchronous signal and/or the row synchronous signal, so as to avoid a poor display defect of the display panel due to interference between the driving signal and the display signal of the display panel.

In addition, on the one hand the main control circuit may perform information interaction with the near-field communication control device through an I2C/SPI serial port, and on the other hand may perform information interaction with the display control circuit through MIPI, so that the main control circuit may send a control signal to the display control circuit according to the interaction information between the external device and the display device, so that the display control circuit controls, according to the control signal, the display panel to display an image corresponding to the interaction information.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and essence of the present disclosure, and these changes and modifications are to be considered within the scope of the present disclosure.

What is claimed is:

1. A near-field communication control device for a display device, the display device comprising a display panel, a near-field communication coil and a display control circuit, wherein the display panel comprises a plurality of display periods, and each of the plurality of display periods comprises a field blanking phase and an effective display phase, the near-field communication control device comprises:
    a first receiving circuit configured to receive a synchronization signal output from the display control circuit, wherein the display panel displays an image during the effective display phase under the control of the synchronization signal; and
    a driving circuit configured to output a driving signal to the near-field communication coil during the field blanking phase, according to the synchronization signal,
    the driving circuit comprises:
    a processing sub-circuit configured to determine start timings, at each of which the driving signal starts to be output, according to a pre-acquired correspondence between the synchronous signal and the field blanking phase, wherein each of the start timings is in the field blanking phase; and
    an output sub-circuit configured to output the driving signal for a preset time period starting from the start timing, the preset time period being less than a preset duration of a back porch period of the field blanking phase.

2. The near-field communication control device of claim 1, wherein the synchronization signal comprises a field synchronization signal, and the start timing at which the driving signal starts to be output for the $i^{th}$ time is a timing of an $(i \times N)^{th}$ active edge of the field synchronization signal, wherein N is a positive integer.

3. The near-field communication control device of claim 1, wherein the processing sub-circuit is configured to:
    determining a duration of the display period of the display panel according to the synchronous signal;
    determining a duration of a control period of the near-field communication control module according to the duration of the display period and a preset ratio, wherein the duration of the control period is a duration of an interval time period between the start timings of two adjacent outputs of the drive signal;

determining the start timing at which the driving signal starts to be output for the first time, according to the pre-acquired correspondence between the synchronous signal and the field blanking phase; and determining the start timings at each of which the driving signal starts to be output after the driving signal is output for the first time, according to the start timing at which the driving signal starts to be output for the first time and the duration of the control period.

4. The near-field communication control device of claim 3, wherein
the synchronization signal comprises a field synchronization signal and/or a row synchronization signal.

5. The near-field communication control device of claim 1, wherein the driving signal comprises a plurality of pulses; the output sub-circuit comprises:
a crystal oscillator configured to generate an initial clock signal;
a timer;
a pulse generation circuit configured to generate, according to timing of the timer and the initial clock signal, an initial driving signal for a preset time period starting from the start timing, the initial driving signal being a digital signal; and
a digital-to-analog conversion circuit configured to perform digital-to-analog conversion on the initial driving signal, to generate and output the driving signal.

6. The near-field communication control device of claim 1, further comprising:
a second receiving circuit configured to receive induction information from the near-field communication coil and perform a pre-processing on the induction information; and
a transmission circuit configured to transmit the pre-processed induction information to a main control circuit, so that the main control circuit determines interaction information between an external device and the display device according to the pre-processed induction information.

7. The near-field communication control device of claim 6, wherein the pre-processing comprises an analog-to-digital conversion.

8. A display device, comprising a display panel, a near-field communication coil and the near-field communication control device of claim 1.

9. A near-field communication control method for a display device, the display device comprising a display panel, a near-field communication coil and a display control circuit, wherein the display panel comprises a plurality of display periods, and each of the plurality of display periods comprises a field blanking phase and an effective display phase, the near-field communication control method comprises:

receiving a synchronization signal output from the display control circuit, wherein the display panel displays an image during the effective display phase under the control of the synchronization signal; and outputting a driving signal to the near-field communication coil during the field blanking phase, according to the synchronization signal, wherein outputting the driving signal to the near-field communication coil during the field blanking phase according to the synchronization signal, comprises:

determining start timings, at each of which the driving signal starts to be output, according to a pre-acquired correspondence between the synchronous signal and the field blanking phase, wherein each of the start timings is in the field blanking phase; and outputting the driving signal for a preset time period starting from the start timing, the preset time period being less than a preset duration of a back porch period of the field blanking phase.

10. The near-field communication control method of claim 9, wherein the synchronization signal comprises a field synchronization signal, and the start timing at which the driving signal starts to be output for the $i^{th}$ time is a timing of an $(i \times N)^{th}$ active edge of the field synchronization signal, wherein N is a positive integer.

11. The near-field communication control method of claim 9, wherein determining start timings, at each of which the driving signal starts to be output, according to the pre-acquired correspondence between the synchronous signal and the field blanking phase, comprises:

determining a duration of the display period of the display panel according to the synchronous signal;

determining a duration of a control period of the near-field communication control module according to the duration of the display period and a preset ratio, wherein the duration of the control period is a duration of an interval time period between the start timings of two adjacent outputs of the drive signal;

determining the start timing at which the driving signal starts to be output for the first time, according to the pre-acquired correspondence between the synchronous signal and the field blanking phase; and determining the start timings, at each of which the driving signal starts to be output after the driving signal is output for the first time, according to the start timing at which the driving signal starts to be output for the first time and the duration of the control period.

12. The near-field communication control method of claim 11, wherein the synchronization signal comprises a field synchronization signal and/or a row synchronization signal.

* * * * *